Jan. 23, 1934.                A. L. HESTON                1,944,865
                           TIRE BUILDING FORM
                         Filed Oct. 30, 1931          2 Sheets-Sheet 2

INVENTOR
                                              ALLEN L. HESTON
                                   BY
                                              Ely H Barrow
                                                    ATTORNEYS Patented Jan. 23, 1934

1,944,865

UNITED STATES PATENT OFFICE 1,944,865

TIRE BUILDING FORM

Allen L. Heston, Akron, Ohio, assignor to National Rubber Machinery Company, Akron, Ohio, a corporation of Ohio Application October 30, 1931. Serial No. 571,997

7 Claims. (Cl. 154—9)

This invention relates to tire building forms, and more especially it relates to collapsible tire building forms of the drum type used in the manufacture of pneumatic tires by the flat band or pulley-band method.

Tire building drums of the character mentioned usually are provided with laterally adjustable wings or side flanges by means of which it is possible to utilize a single drum for the manufacture of a plurality of tire bands of different widths but of the same bead diameter. The building of tire bands of different bead diameters with drums of the character mentioned requires the use of respective drums for each different bead diameter, with the result that a large amount of equipment is required for the manufacture of a complete line of tire sizes. Frequently much of this equipment is idle since even the largest rubber companies do not make enough tires of every size to keep all the drums constantly in operation.

The chief objects of this invention are to increase the usefulness of tire building drums in their capacity for building tire casings of various sizes; to provide a rotatable collapsible chuck with removable drum sections that may be easily and quickly mounted and removed; and to effect accuracy of dimensions in drum-built tire casings. In general, the invention aims to effect economies of time, labor, and equipment by providing a drum unit adapted for the manufacture of substantially a complete range of tire sizes, which unit is easily, quickly, and accurately altered in changing from one size to another.

Of the accompanying drawings.

Figure 1:
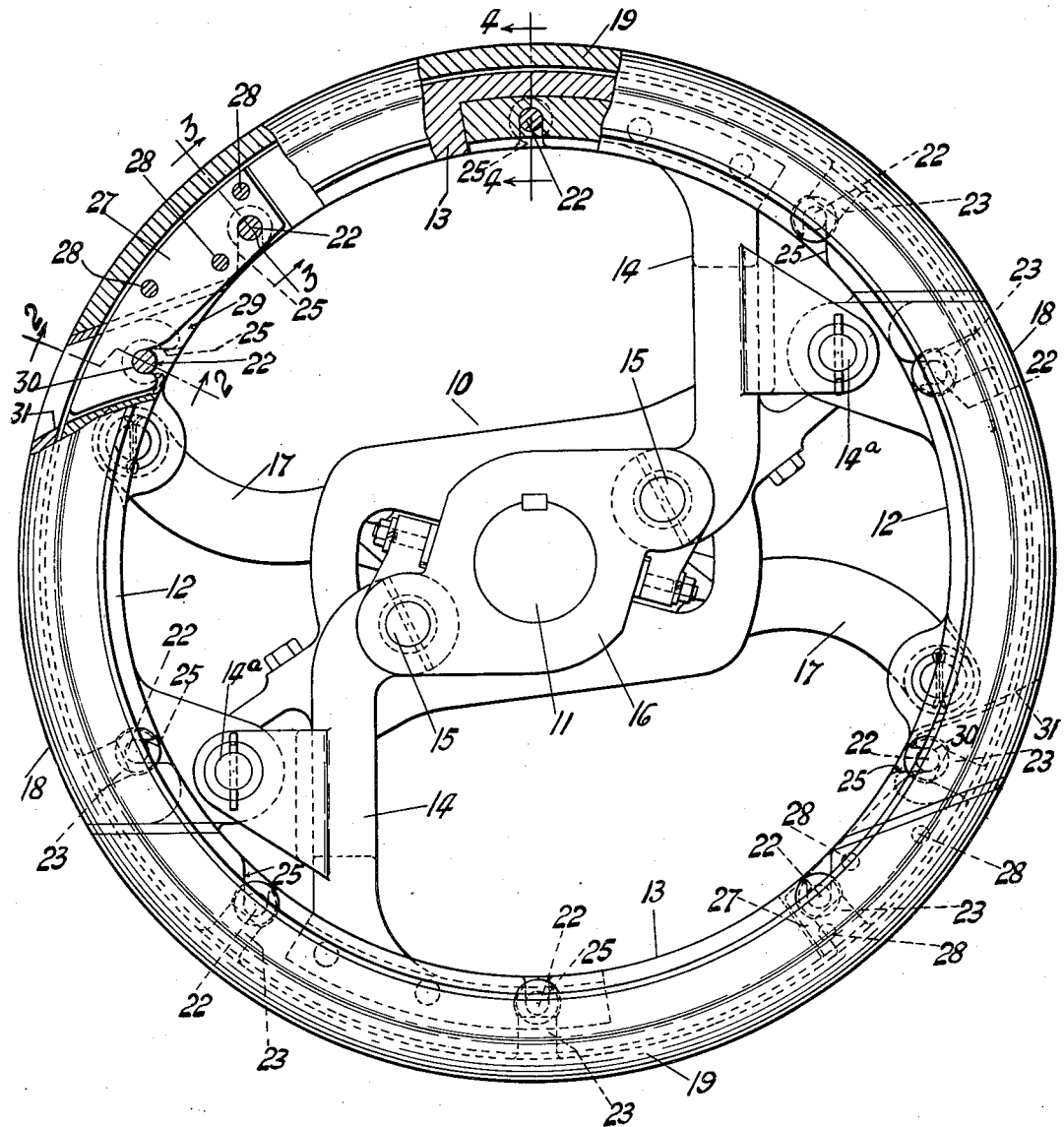
Figure 1 is a side elevation of a tire building unit embodying the invention in its preferred form, parts being broken away and in section.

Referring to Figure 1 of the drawings, 10 represents generally a drum-supporting chuck that is mounted upon a rotatable spindle 11 of a tire building machine of any known or preferred construction, the chuck comprising an annular rim or drum-support consisting of two oppositely disposed key sections 12, 12, and intermediate sections 13, 13. The invention is adapted for use with almost any kind of collapsing chuck, but it is especially useful with chucks having pivotally mounted key sections that move to operative or inoperative position by angular movement as distinguished from radial movement. In the chuck shown the intermediate rim sections 13 are fixedly mounted upon the ends of respective arms 14, 14 that are pivotally mounted at 15, 15 upon a hub 16 that is keyed to spindle 11. Key sections 12, 12 of the rim are pivotally mounted at 14a, 14a on the respective arms 14, and respective links 17, 17 are connected to the free end portions of the key sections, and to a toggle structure (not shown) movable relatively of the hub 16, whereby the key sections are moved angularly in the collapsing or expanding of the chuck.

Mounted upon the respective rim sections 12, 13 are drum sections 18, 19, that are centrally divided into two lateral halves so that each rim section carries two halves. The halves of each drum section are substantially identical in construction, each comprising a peripheral portion that overlies half the rim section and a flange or shoulder portion at its outer lateral margin. Thus there are eight drum sections to a set, which when assembled on the chuck 10 constitute a complete tire building drum. Preferably there is a set of drum sections for every tire size, and each chuck will be provided with a set for each tire size, or as many sets as may be deemed desirable.

For securing the drum sections 18 and 19 to the rim sections 12, 13, each of the drum sections is formed with a pair of parallel, inwardly extending radial flanges 18a, 18a or 19a, 19a, the height of said flanges varying in the different sets of sections to provide the requisite outside diameter for the different drums. The inner lateral faces of the flanges 18a, 19a are formed with respective ribs 20, which ribs interfit with complemental grooves 21 formed in the respective lateral marginal portions of the rim sections 12, 13, the arrangement assuring accurate radial positioning of the drum sections.

The drum sections 18, 19 are secured to the rim sections 12, 13 by bolts 22, 22, there being two bolts for sections 18 and three bolts for sections 19. The bolts 22 extend through the rim sections 12, 13, and through the flanges 18a, 19a of the drum sections in the region of the ribs 20, the heads of the bolts 22 having chordal flat portions that fit against respective fillets 23 formed on the flanges 18a, 19a of the drum sections on one side of the drum to prevent turning of the bolts when the nuts 24 thereon are tightened or loosened. To permit removal of the drum sections from the rim sections without requiring complete removal of the bolts 22, the flanges 18a, 19ᵃ of the drum sections are slotted at 25, 25 from the bolt holes to the inner periphery of the flanges, the slots of each drum section being parallel so that when the bolts 22 are loosened the drum sections can be lifted off the rim.

The rim sections and the drum sections are beveled at their meeting ends in the usual manner, and that end portion of each intermediate rim section 13 that adjoins the free end of a rim section 12 is slotted each side of the central plane of the drum structure and has respective plates 27 inset in said slots and secured therein by pins 28, 28 extending into the rim section, said plates 27 projecting beyond the end of the intermediate rim section 13 and extending into complemental slots 29 formed in the key sections 12. The projecting end portion of each plate 27 is recessed at 30 so that the plate constitutes a hook adapted to engage the adjacent bolt 22 of the key section to limit the outward movement of the latter in moving to operative position. The drum sections 18 are slotted at 31, 31 to permit them to pass the plates 27 in moving with the rim sections to or from operative position.

Figure 2:
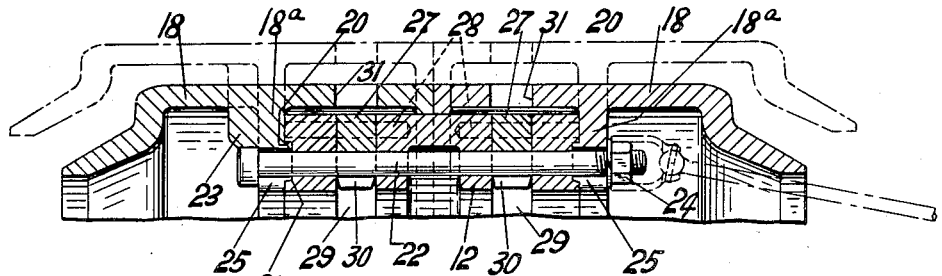
Figure 2 is a section on the line 2—2 of Figure 1.
Figure 3:
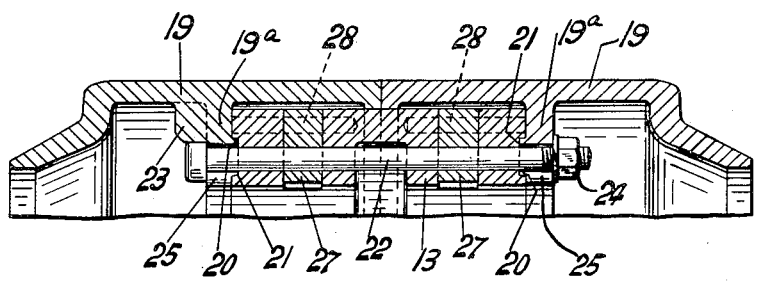
Figure 3 is a section on the line 3—3 of Figure 1.
Figure 4:
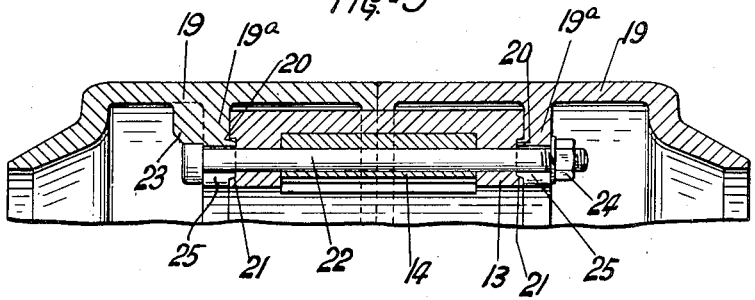
Figure 4 is a section on the line 4—4 of Figure 1.

With the improved tire building form, the operation of changing from one size drum to another is a simple matter not requiring particular skill to obtain proper dimension, in fact, the changing may be made by the tire builder who might otherwise be idle. To change the form from one size to another, for example, from that shown in full lines in Figure 2 to the size shown in broken lines therein, the nuts 24 are unthreaded on the bolts 23 a little more than the depth of the grooves 21. This allows the drum sections 18, 19 on that side of the form to be pulled laterally so that the ribs 20 clear the grooves 21, and then to be lifted from the rim sections, the slots 25 in the drum flanges permitting the latter to pass the bolts.

When the drum sections on one side are removed, the bolts 22 are pushed axially to move their heads away from the flanges 18ᵃ, 19ᵃ of the drum sections on the opposite side of the form, thus permitting said sections to be pulled axially to clear their ribs 20 from the grooves 21, and then to be lifted from the rim sections as previously described. The procedure is reversed to mount the drum sections on the rim sections. The only tool required is a socket wrench, which may comprise a universal joint, as shown in broken lines in Figure 2, for use with drum sections of small diameter, the lateral flanges or wings of such sections extending too far inward to permit use of a straight socket wrench.

Figure 5:
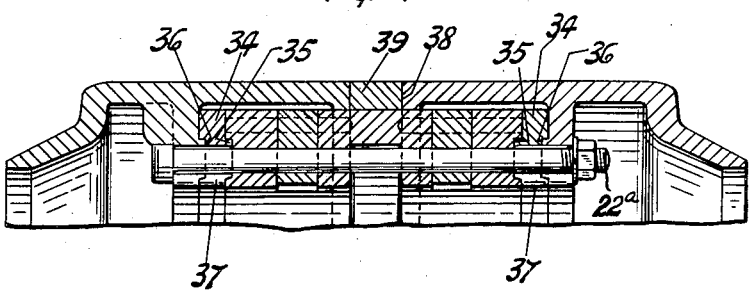
Figure 5 is a section similar to Figure 3 of a modified form of the invention.

The modified structure shown in Figure 5 may be used when, for the sake of economy, it is not expedient to use a separate set of drum sections for drums of the same bead diameter that differ only in width. The modified tire building form comprises a set of spacer members 34, 34 that are mounted upon one or both sides of the form, between the respective rim sections and the attaching flanges of the drum sections. Opposite sides of each spacer member are formed respectively with a rib 35 and a groove 36 which register respectively the groove in the rim section and the rib on the flange of the drum section. The spacer members may be slotted as at 37, 37 to permit mounting upon the bolts 22ᵃ without removing said bolts from the rim sections. The use of spacer members 34 results in central circumferential recess 38 in the working surface of the drum, between drum sections, and this recess may be closed by any suitable filler 39 if desired.

Other modifications are possible without departing from the spirit of the invention, or the scope of the appended claims which are not limited wholly to the specific construction shown and described.

What is claimed is:—

1. In a tire building form, the combination of a sectional annular rim structure, means for supporting, driving, and collapsing the same, a pair of drum sections for each rim section, each drum section being formed with an inwardly extending flange, and a plurality of bolts for securing the drum flanges to the rim sections, said flanges being formed with slots permitting the removal of the drum sections without complete removal of the bolts.

2. In a tire building form, the combination of sectional annular rim structure, means for supporting, driving, and collapsing the same, centrally divided drum sections mounted upon the respective rim sections, each of said drum sections being formed with a radially inwardly extending flange for positioning the section in radially spaced relation to the rim section, bolts securing the drum-section-flanges to the rim sections, and spacer members disposed between said flanges and rim sections and traversed by said bolts.

3. A combination as defined in claim 2 in which the spacer members have tongue and groove connection with the drum sections and the rim sections.

4. A combination as defined in claim 2 in which the spacer members are formed with slots permitting their mounting or removal without removal of the bolts.

5. In a tire building form, the combination of an annular sectional rim comprising a pair of pivotally mounted key sections and a pair of intermediate sections, means for supporting, driving, and collapsing the rim, respective plates mounted in one end of each intermediate rim section and extending therefrom into complemental slots formed in the free end of the respective key sections, the projecting portion of each plate being formed as a hook, drum sections mounted upon respective rim sections, and bolts securing the drum sections to the rim sections, one of said bolts in each key section being so disposed as to engage the hook-end of the plate in the intermediate section so as to limit pivotal movement of the key section in one direction.

6. A combination as defined in claim 5 in which each drum section is centrally divided and the bolts secure the two parts thereof to a rim section and to each other.

7. In a tire building form, the combination of an annular sectional rim comprising a pair of pivotally mounted key sections and a pair of intermediate sections, means for supporting, driving, and collapsing the rim, drum sections mounted upon the respective rim sections, means for securing the drum sections to the rim sections, and means on the intermediate rim sections cooperating with the last mentioned means for limiting pivotal movement of the key sections in one direction.

ALLEN L. HESTON.